US005169525A

United States Patent [19]

Gerteis

[11] Patent Number: 5,169,525

[45] Date of Patent: Dec. 8, 1992

[54] INVERTABLE FILTER CENTRIFUGE

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 778,996

[22] PCT Filed: May 11, 1990

[86] PCT No.: PCT/EP90/00764

§ 371 Date: Nov. 8, 1991

§ 102(e) Date: Nov. 8, 1991

[87] PCT Pub. No.: WO90/14166

PCT Pub. Date: Nov. 29, 1990

[51] Int. Cl.[5] .......................................... B01D 33/067

[52] U.S. Cl. .................................... 210/232; 210/373; 210/380.3; 210/416.1; 494/23; 494/25; 494/26; 494/38; 494/41; 494/83

[58] Field of Search ............ 210/232, 236, 370, 380.1, 210/365, 367, 781, 408, 380.3, 373, 416.1; 494/41, 83, 38, 26, 39, 40, 23, 25

[56] References Cited

U.S. PATENT DOCUMENTS

| | | | |
|---|---|---|---|
| 5,004,540 | 4/1991 | Hendricks | 210/232 |
| 5,092,995 | 3/1992 | Gerteis | 210/232 |

FOREIGN PATENT DOCUMENTS

| | | |
|---|---|---|
| 3430507 | 2/1986 | Fed. Rep. of Germany . |
| 3740411 | 6/1989 | Fed. Rep. of Germany . |

*Primary Examiner*—Robert A. Dawson
*Assistant Examiner*—David Reifsnyder
*Attorney, Agent, or Firm*—Shenier & O'Connor

[57] ABSTRACT

An inverted filter centrifuge consisting of a drum arranged to rotate freely in a housing and having radial filtrate outlets; a cover closing one of its free frontal areas, the drum and the cover being mutually axially movable; a filler aperture in the cover for the suspension to be filtered and a filler pipe passing through the filler aperture. The filler aperture in the cover can be hermetically sealed by a locking component rotating together with the drum which is disconnected from the filler pipe in a manner to avoid friction.

7 Claims, 2 Drawing Sheets

INVERTABLE FILTER CENTRIFUGE

The invention relates to an invertable filter centrifuge comprising a drum mounted in a housing in a cantilever manner and having radial filtrate openings, a cover closing a free end face of the drum, drum and cover being axially displaceable relative to one another, a feed opening for suspension to be filtered provided in the cover and a feed pipe penetrating the feed opening, the feed opening of the cover being sealable by a closure element rotating together with the drum.

In a known invertable filter centrifuge of this type (DE-A 34.30.507), the closure element at the feed opening of the cover is merely a spray protection which prevents liquid spraying out of the drum.

In invertable filter centrifuges of this type it is often advantageous for the drum to be acted upon by a gas subjected to overpressure (for example, superheated steam) in order to increase the hydraulic pressure resulting in the field of centrifugal force in the drum or to blow through the filter cake for the purpose of drying it or also to subject it to a steam wash. In addition, it can alternatively be desired to subject the drum to a vacuum.

A pressure variation of this type in the interior of the drum is not possible in an invertable filter centrifuge of the generic type since in this case the feed pipe penetrating the feed opening is not tightly sealed.

The object of the invention is to improve an invertable filter centrifuge of the generic type such that the centrifugal chamber enclosed by the drum can be acted upon by overpressure or underpressure.

The object is accomplished in accordance with the invention either in that the feed pipe is designed to be withdrawable from the feed opening of the cover and the feed opening is hermetically sealable by a closure element arranged on the cover or in that a movable closure element is provided which is adapted to be placed sealingly over the feed opening of the cover and the end of the feed pipe from the inside of the drum.

The following description of preferred embodiments of the invention serves to explain the invention in greater detail in conjunction with the attached drawings. In these drawings FIG. 1 is a schematic part-sectional view of an invertable filter centrifuge;

Figure 1:
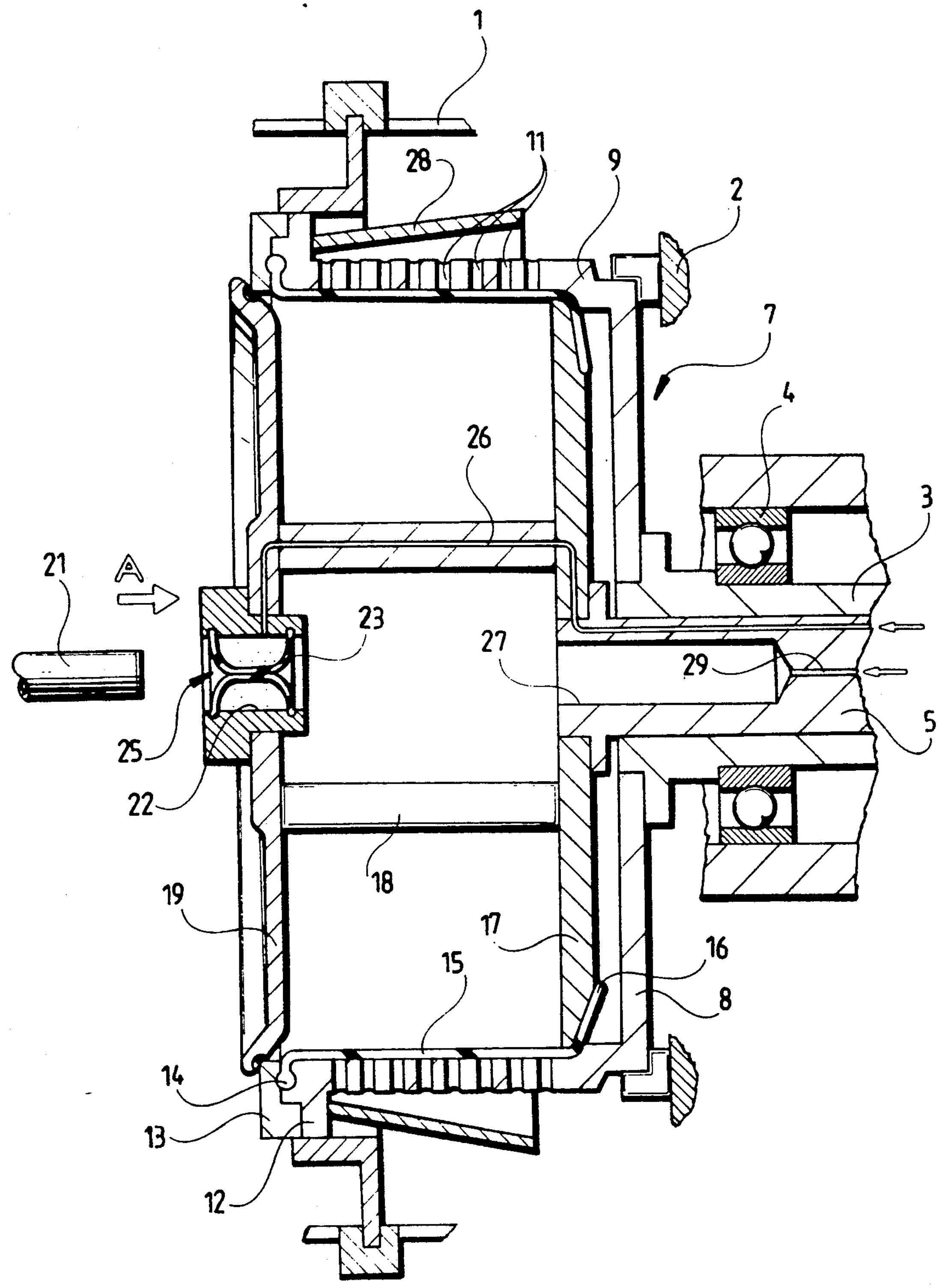

The invertable filter centrifuge illustrated in FIG. 1 comprises a housing 1 which is merely indicated schematically and hermetically seals the entire machine. In this housing, a hollow shaft 3 is rotatably mounted in bearings 4 on a stationary machine frame 2. The end of the hollow shaft 3 located to the right (not illustrated) and projecting beyond the bearing 4 is connected to a drive motor (also not illustrated), which can cause the hollow shaft 3 to rotate rapidly.

A shaft 5 is non-rotatably but displaceably arranged in the interior of the hollow shaft 3. The shaft 5 rotates together with the hollow shaft 3 but is displaceable axially therein.

A bowl-shaped centrifugal drum 7 is flange-mounted with its base 8 in a cantilever manner at the end of the hollow shaft 3 located to the left in FIG. 1 and protruding beyond the bearing 4. The drum 7 has radially extending through openings 11 in its circular-cylindrical side wall 9. The drum 7 is open at its end face opposite the base 8. The one edge 14 of a filter cloth 15 substantially tubular in design is sealingly clamped by means of a holding ring 13 at the flange-like edge 12 of the opening surrounding this open end face. The other edge 16 of the filter cloth 15 is sealingly connected in a corresponding manner to a base portion 17 which is rigidly connected to the displaceable shaft 5 which penetrates freely through the base 8.

A centrifugal chamber cover 19 is rigidly attached to the base portion 17 via spacer bolts 18, leaving an intermediate space free. This cover hermetically closes the centrifugal chamber of the drum 7 by engaging on the edge of its opening and can be lifted freely away from the drum 7, together with the base portion 17, due to axial outward displacement of the shaft 5 out of the hollow shaft 5. In a different embodiment, the drum 7 can also, for the same purpose, be axially displaceable relative to the stationary cover 19.

A feed pipe 21 is arranged at the left front end, according to FIG. 1, of the invertable filter centrifuge. This pipe serves to supply a suspension which is to be separated into its solid and liquid components to the centrifugal chamber of the drum 7.

The free end of the feed pipe 21 is, for this purpose, led through a central feed opening 22 in the cover 19 into the drum interior and after the drum has been filled is withdrawn again into the position illustrated in FIG. 1.

Figure 2:
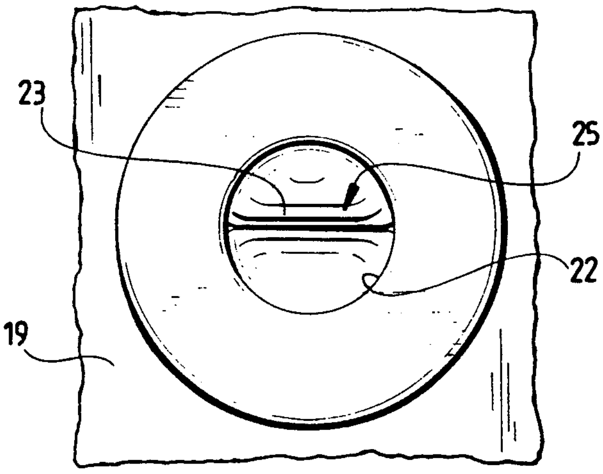
FIG. 2 is a view in the direction of arrow A in FIG. 1.

The feed opening 22 can be closed by a squeeze valve 25 which is known per se and formed by a tube 23. The interior of the tube 23 can be filled with a hydraulic or pneumatic pressure medium via a line 26 penetrating the shaft 5, the one spacer bolt 18 and the cover 19. The squeeze valve 25 is hereby closed so as to be pressure-tight. This state is illustrated in FIG. 2.

When the drum 7 is opened, i.e. when the cover 19 is lifted away from the edge of the drum by displacing the shaft 5, the feed pipe 21 located in the position according to FIG. 1 can pass through the squeeze valve 25, which is now opened, and in a space saving manner into a bore 27 of the shaft 5. The squeeze valve 25 is designed such that in its opened state no friction will in practice occur between the tube 23 and the feed pipe 21.

The squeeze valve 25 as described can also be replaced by a valve of a different type, for example a ball valve or a slide valve, as long as it is ensured that such a closure element which rotates together with the drum 7 hermetically seals the drum at the feed opening 22 and in the opened state allows the feed pipe 21 to penetrate without any friction contact.

During operation, the invertable filter centrifuge first takes up the position illustrated in FIG. 1. The displaceable shaft 5 is withdrawn into the hollow shaft 3. As a result, the base portion 17 connected to the shaft 5 is located in the vicinity of the base 8 of the centrifugal drum 7 and the filter cloth 15 is turned inwards into the drum in such a manner that it is located in the interior thereof. The centrifugal chamber cover 19 hereby abuts sealingly on the edge of the opening of the drum 7. When the drum 7 rotates and the squeeze valve 25 is open, suspension to be filtered is supplied via the feed pipe 21 pushed through the opened squeeze valve. Once the feed pipe 21 has been withdrawn, the squeeze valve 25 is closed and the drum, if necessary, cause to rotate more rapidly. The liquid components of the suspension pass through the openings 11 of the drum and are conducted away from a baffle plate 28. The solid particles of the suspension are retained by the filter cloth 15.

During this process, an overpressure can be generated in the interior of the drum 7 via a line 29 formed in the shaft 5. If required, it is also possible to generate a vacuum in the drum interior via this line 29. In other cases, the alteration of the interior pressure in the drum 7 can also be omitted. Nevertheless, it can be important for the feed opening 22 to be hermetically sealed by the squeeze valve 25 or another closure element.

Once the filtering process has been completed, the shaft 5 is moved to the left while the centrifugal drum 7 continues to rotate and the squeeze valve 25 is now open (and, if necessary, the overpressure or vacuum source switched off), whereby the filter cloth 15 is turned outwards and the solid particles adhering thereto are catapulted outwards into the housing 1. From here they can easily be conveyed away. In this position of the drum 7, the feed pipe 21 penetrates through the now open squeeze valve 25 without friction into the bore 27 of the shaft 5.

Once the solid particles have been thrown off under the influence of the centrifugal force, the invertable filter centrifuge is brought back into its operative position according to FIG. 1 by moving the shaft 5 back, the filter cloth 15 hereby being turned back in the opposite direction. In this way, it is possible to operate the centrifuge with a constantly rotating centrifugal drum 7 and the pressure ratios in the drum 7 can be optionally adjusted.

Figure 3:
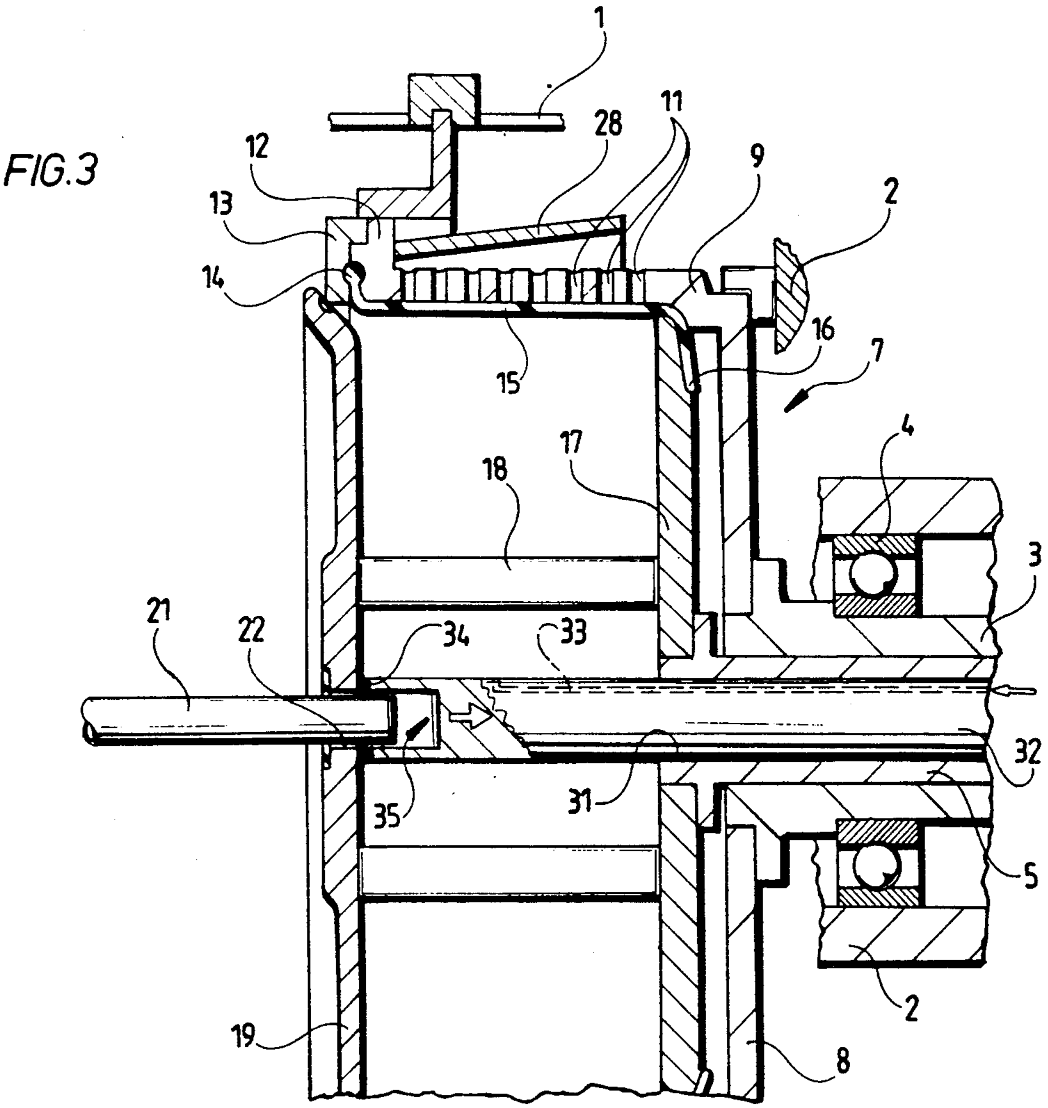
FIG. 3 is a schematic part-sectional view similar to FIG. 1 of a different embodiment of an invertable filter centrifuge.

FIG. 3 shows a modified embodiment of an invertable filter centrifuge. In FIG. 3, corresponding parts have been designated with the same reference numerals as those in FIG. 1. Unlike FIG. 1, the shaft 5 of the embodiment according to FIG. 3 is also designed as a hollow shaft. In the interior bore 31 of this hollow shaft 5, a closure element 32 in the form of a piston rod is displaceable into the interior of the drum 7 such that it hermetically seals the feed opening 22 from the inside of the drum. A line 33 is formed in the closure element 32, with the aid of which a vacuum or overpressure can be generated in the interior of the drum 7. The closure element 32 can be actuated hydraulically or pneumatically in a manner known per se. In order to provide a pressure-tight closure, the end of the closure element 32 abutting on the inner side of the centrifugal chamber cover 19 has a seal 34.

As illustrated, the closure element 32 is designed at its free front end as a sleeve 35, the end of the feed pipe 21 protruding into the drum 7 being able to penetrate the interior chamber of this sleeve.

The embodiment of an invertable filter centrifuge according to FIG. 3 operates in the same way as that described on the basis of the embodiment according to FIG. 1. In contrast to FIG. 1, the feed pipe 21 of the embodiment according to FIG. 3 does not, however, need to be moved back and forth but can, in this respect, be rigidly connected with the machine frame 2. When the drum is being filled with suspension, the closure element 32 is withdrawn (to the right in FIG. 3) so that the opening of the feed pipe 21 is left free. While the interior of the drum is subjected to pressure via the line 33, the closure element 32 takes up the position illustrated in FIG. 3.

I claim:

1. Invertable filter centrifuge comprising a drum mounted in a housing in a cantilever manner and having radial filtrate openings, a cover closing a free end face of the drum, drum and cover being axially displaceable relative to one another, a feed opening for suspension to be filtered provided in the cover and a feed pipe penetrating the feed opening, the feed opening of the cover being sealable by a closure element rotating together with the drum, the improvement being that the feed pipe (21) is designed to be withdrawable from the feed opening (22) of the cover (19) and the feed opening is hermetically sealable by a closure element (25) arranged on the cover.

2. Invertable filter centrifuge as defined in claim 1, the improvement being that the drum is connectable from its side remote from the feed pipe (21) with a pressure or vacuum source via a line (29, 33).

3. Invertable filter centrifuge as defined in claim 1, the improvement being that a valve (25) is arranged in the feed opening (22), said valve forming in its one position a free passage for the feed pipe (21) and in its other position hermetically sealing the feed opening (22) when the feed pipe (21) is pushed back.

4. Invertable filter centrifuge as defined in claim 4, the improvement being that the valve (25) is a fluid-actuated squeeze valve.

5. Invertable filter centrifuge comprising a drum mounted in a housing in a cantilever manner and having radial filtrate openings, a cover closing a free end face of the drum, drum and cover being axially displaceable relative to one another, a feed opening for suspension to be filtered provided in the cover and a feed pipe penetrating the feed opening, the feed opening of the cover being sealable by a closure element rotating together with the drum, the improvement being that a movable closure element (32) is provided, said element being adapted to be placed sealingly over the feed opening (22) of the cover (19) and the end of the feed pipe (21) from the inside of the drum.

6. Invertable filter centrifuge as defined in claim 2, the improvement being that the drum (7) is arranged on a hollow shaft (3) and the closure element (32) is mounted for displacement in the hollow shaft (3) such that it hermetically seals the feed opening (22) from the inside of the drum (7).

7. Invertable filter centrifuge as defined in claim 6, the improvement being that the closure element (32) is designed as a sleeve (35), the end of the feed pipe (21) penetrating said sleeve.

* * * * *

UNITED STATES PATENT AND TRADEMARK OFFICE
CERTIFICATE OF CORRECTION

PATENT NO. : 5,169,525

DATED : December 8, 1992

INVENTOR(S) : Hans Gerteis

It is certified that error appears in the above-identified patent and that said Letters Patent is hereby corrected as shown below:

Col. 4, Claim 4, first line of the claim after "claim" delete "4" and substitute --3--;

Claim 6, first line of the claim after "claim" delete "2" and substitute --5--.

Signed and Sealed this

Twelfth Day of October, 1993

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,169,525

DATED : December 8, 1992

INVENTOR(S) : HANS GERTEIS

It is certified that error appears in the above-identified patent and that said Letters Patent is hereby corrected as shown below:

Title page, col. 1, item

[30] Foreign Application Priority Data

May 19, 1989 Fed. Rep. of Germany P 3916266.4

Signed and Sealed this

Ninth Day of November, 1993

*Attest:*

Bruce Lehman

BRUCE LEHMAN

*Attesting Officer*

*Commissioner of Patents and Trademarks*